US011070087B2

(12) United States Patent
Salvekar et al.

(10) Patent No.: US 11,070,087 B2
(45) Date of Patent: Jul. 20, 2021

(54) WIRELESS POWER SYSTEM WITH IN-BAND COMMUNICATION

(71) Applicant: Apple Inc., Cupertino, CA (US)

(72) Inventors: Atul A. Salvekar, Oakland, CA (US); Jeffrey D. Louis, Auckland (NZ)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 16/194,669

(22) Filed: Nov. 19, 2018

(65) Prior Publication Data
US 2019/0238000 A1 Aug. 1, 2019

Related U.S. Application Data

(60) Provisional application No. 62/622,859, filed on Jan. 27, 2018.

(51) Int. Cl.
H02J 50/12 (2016.01)
H02J 50/80 (2016.01)
H02J 7/02 (2016.01)
H02J 5/00 (2016.01)

(52) U.S. Cl.
CPC .............. H02J 50/12 (2016.02); H02J 5/005 (2013.01); H02J 7/025 (2013.01); H02J 50/80 (2016.02)

(58) Field of Classification Search
None
See application file for complete search history.

(56) References Cited

U.S. PATENT DOCUMENTS 9,564,758 B2  2/2017 Kadoyama
9,806,767 B2  10/2017 Walley et al.
2009/0110105 A1* 4/2009 Tzannes ............ H04L 25/03866
                                                    375/267
2013/0026981 A1* 1/2013 Van Der Lee ....... H04B 5/0075
                                                    320/108
2017/0149284 A1* 5/2017 Von Novak, III ...... H02J 7/025
2018/0351392 A1  12/2018 Malkin et al.
2019/0089171 A1* 3/2019 Fischer .................. H02J 7/025
2019/0180904 A1* 6/2019 Mattsson ................ H01F 21/12
2019/0181697 A1* 6/2019 Malkin .................... H02J 50/12
2019/0393734 A1  12/2019 Zhou et al.
2020/0083747 A1  3/2020 Huang et al.
2020/0274403 A1  8/2020 Malkin et al.

* cited by examiner

Primary Examiner — Jared Fureman
Assistant Examiner — Aqeel H Bukhari
(74) Attorney, Agent, or Firm — Treyz Law Group, P.C.; Joseph F. Guihan

(57) ABSTRACT

A wireless power receiving device has a receive coil that receives wireless power signals from a wireless power transmitting device and has a rectifier that produces direct-current power from the received wireless power signals. The receive coil of the wireless power receiving device is coupled to wireless transceiver circuitry. Similarly the transmit coil of the wireless power transmitting device is coupled to wireless transceiver circuitry. The wireless transceiver circuitry in the wireless power receiving device or transmitting may be configured to generate and/or modulate one or more data carrier waves using any desired modulation scheme. The one or more modulated data carrier waves are transmitted between the transmit coil and the receive coil of the corresponding wireless power transmitting and receiving devices. The one or more data carrier waves may have a frequency that is different than the power transmission frequency.

29 Claims, 5 Drawing Sheets

(54) WIRELESS POWER SYSTEM WITH IN-BAND COMMUNICATION

This case claims the benefit of provisional patent application No. 62/622,859, filed Jan. 27, 2018, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a coil and rectifier circuitry. The coil receives alternating-current wireless power signals from a coil in the wireless charging mat that is overlapped by the coil in the portable electronic device. The rectifier circuitry converts the received signals into direct-current power.

SUMMARY

A wireless power system has a wireless power transmitting device and a wireless power receiving device. The wireless power receiving device has a receive coil that receives wireless power signals from the wireless power transmitting device and has a rectifier that produces direct-current power from the received wireless power signals. The wireless power transmitting device has at least one transmit coil. In some cases, the wireless power transmitting device may have an array of transmit coils.

The receive coil of the wireless power receiving device is coupled to wireless transceiver circuitry. The array of transmit coils of the wireless power transmitting device is coupled to wireless transceiver circuitry. The wireless transceiver circuitry in the wireless power receiving device may be configured to generate one or more data carrier waves that are modulated using any desired modulation scheme. The one or more data carrier waves are then transmitted by the receive coil to the wireless power transmitting device.

The one or more data carrier waves may have a frequency that is different (e.g., higher) than the power transmission frequency. Data may be transferred between the wireless power transmitting device and the wireless power receiving device at a fast rate using the one or more data carrier waves.

DETAILED DESCRIPTION

A wireless power system includes a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

Figure 1:
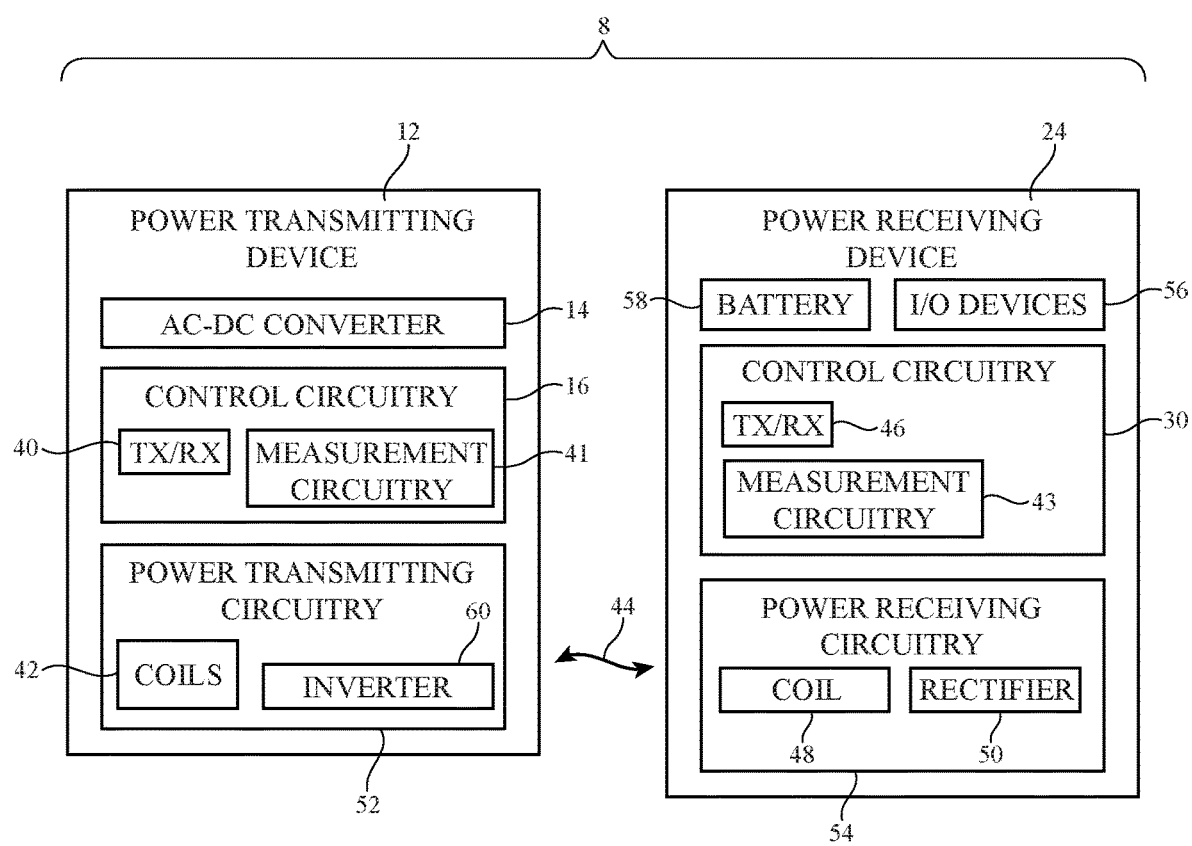
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat).

As the AC currents pass through one or more coils 42, alternating-current electromagnetic (e.g., magnetic) fields (signals 44) are produced that are received by one or more corresponding receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 may be used in powering a battery such as battery 58 and may be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 may also use one or more coils 42 to transmit in-band signals that are received by wireless transceiver circuitry 46 using coil 48. Herein, in-band signals may refer to signals that are communicated between coil(s) 42 and coil(s) 48. The in-band signals may or may not have the same frequency as the power transmission frequency. Similarly, wireless transceiver circuitry 46 may use one or more coils 48 to transmit in-band signals that are received by wireless transceiver circuitry 40 using coil 42. Any suitable modulation scheme may be used to support in-band communications signals via coil(s) 42 and coil(s) 48 between device 12 and device 24.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, between 100 kHz and 205 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

In some cases, wireless transceiver circuitry 40 in power transmitting device 12 and wireless transceiver circuitry 46 in power receiving device 24 may communicate in-band by modulating the AC drive signals that are used to transfer power. Frequency shift keying (FSK), amplitude shift keying (ASK), or any other desired modulation of the AC drive signals may be used to convey in-band data between device 12 and device 24 while power is conveyed wirelessly from device 12 to device 24.

For example, during wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In-band communications between devices 12 and 24 may also use ASK modulation and demodulation techniques. For example, wireless transceiver circuitry 46 may transmit in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

The bandwidth of in-band communications using the AC signals may be dependent upon the power transmission frequency. When the power transmission frequency is about 125 kHz, for example, the bandwidth of ASK transmissions may be about 2 kHz. At these types of data transfer rates, it may take an undesirably long length of time to send some types of information between devices 12 and 24. In one illustrative example, power receiving device 24 may be a cellular telephone that downloads (e.g., from the Internet) a firmware update for the power transmitting device 12 (e.g., a wireless power mat). Transmitting the firmware file from the cellular telephone to the wireless power mat may take hours using ASK transmissions of 2 kHz bandwidth.

To increase the rate of data transmission and increase noise immunity of in-band communications, wireless transceiver circuitry 40 and wireless transceiver circuitry 46 may be configured to inject one or more data carrier waves (that have a higher frequency than the AC drive signals) to the AC drive signals used for wireless power transfer. The data carrier waves may be transmitted between devices 12 and 24 using coils 42 and 48. The data carrier waves may have a higher frequency than the AC drive signals to enable faster data transmission between devices 12 and 24. Power receiving device 24 can transmit data to power transmitting device 12 by modulating the data carrier waves.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 42 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 42 into use. As each coil 42 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements.

The characteristics of each coil 42 depend on whether any foreign objects overlap that coil (e.g., coins, wireless power receiving devices, etc.) and also depend on whether a wireless power receiving device with a coil such as coil 48 of FIG. 1 is present, which could increase the measured inductance of any overlapped coil 42. Signal measurement circuitry 41 is configured to apply signals to the coil and measure corresponding signal responses. For example, signal measurement circuitry 41 may apply an alternating-current probe signal while monitoring a resulting signal at a node coupled to the coil. As another example, signal measurement circuitry 41 may apply a pulse to the coil and measure a resulting impulse response (e.g., to measure coil inductance). Using measurements from measurement circuitry 41, the wireless power transmitting device can determine whether an external object is present on the coils. If, for example, all of coils 42 exhibit their expected nominal response to the applied signals, control circuitry 16 can conclude that no external devices are present. If one of coils 42 exhibits a different response (e.g., a response varying from a normal no-objects-present baseline), control circuitry 16 can conclude that an external object (potentially a compatible wireless power receiving device) is present.

Control circuitry 30 has measurement circuitry 43. In an illustrative arrangement, measurement circuitry 43 of control circuitry 30 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, device 24 may use measurement circuitry 43 to make measurements to characterize device 24 and the components of device 24. For example, device 24 may use measurement circuitry 43 to measure the inductance of coil 48 (e.g., signal measurement circuitry 43 may be configured to measure signals at coil 48 while supplying coil 48 with signals at one or more frequencies to measure coil inductances), signal pulses (e.g., so that impulse response measurement circuitry in the measurement circuitry can be used to make inductance and Q factor measurements), etc. Measurement circuitry 43 may also make measurements of the output voltage of rectifier 50, the output current of rectifier 50, etc.

Figure 2:
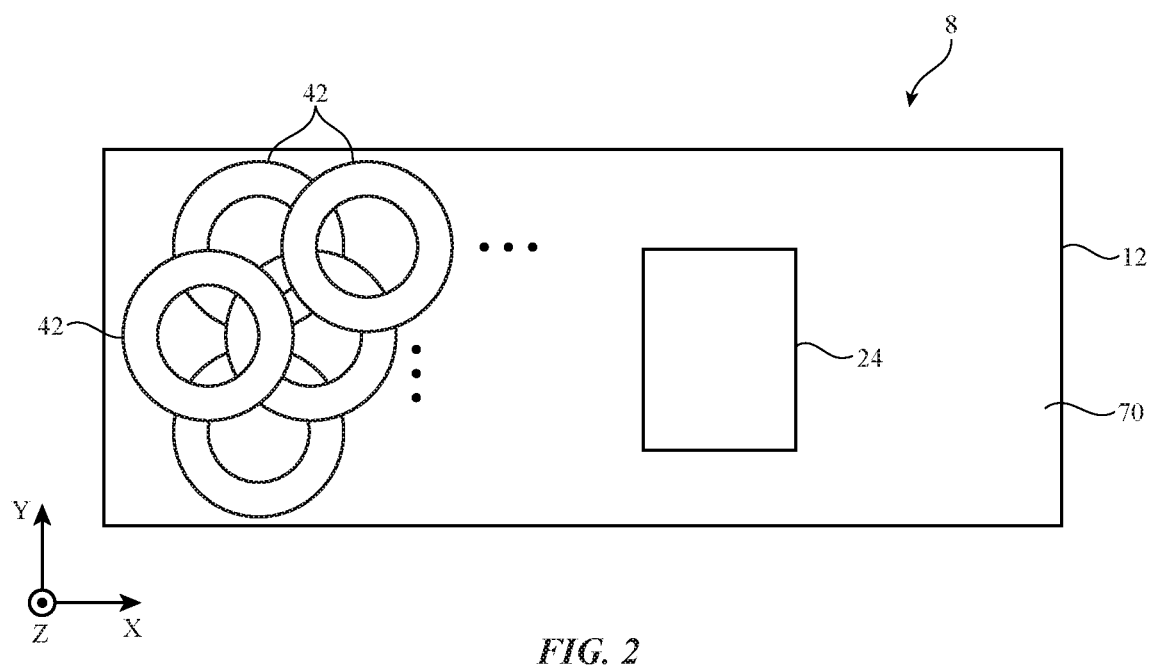
FIG. 2 is a top view of an illustrative wireless power transmitting device having a charging surface on which a wireless power receiving device has been placed in accordance with an embodiment.

A top view of an illustrative configuration for device 12 in which device 12 has an array of coils 42 is shown in FIG. 2. Device 12 may, in general, have any suitable number of coils 42 (e.g., 22 coils, at least 5 coils, at least 10 coils, at least 15 coils, fewer than 30 coils, fewer than 50 coils, etc.). Coils 42 of device 12 may be covered by a planar dielectric structure such as a plastic member or other structure forming charging surface 70. The lateral dimensions (X and Y dimensions) of the array of coils 42 in device 12 may be 1-1000 cm, 5-50 cm, more than 5 cm, more than 20 cm, less than 200 cm, less than 75 cm, or other suitable size. Coils 42 may overlap or may be arranged in a non-overlapping configuration. In a non-overlapping configuration, the coils may be arranged in a single layer (e.g., in a plane parallel to the XY-plane) such that no part of any coil overlaps any of the other coils in the layer. Alternatively, in an overlapping arrangement, coils 42 may be organized in multiple layers. Within each layer, the coils do not overlap. However, coils in one layer may overlap coils in one or more other layers (e.g., when viewed from above the outline of a given coil in a given layer may intersect the outline of a coil in another layer). In one illustrative example, the device may have three layers of coils (e.g., a lower layer having eight coils, a middle layer having seven coils, and an upper layer having seven coils). In general, each layer may have any suitable number of coils (e.g., at least 2 coils, at least 5 coils, fewer than 9 coils, fewer than 14 coils, 6-9 coils, etc.). Device 12 may have one layer of coils, at least two layers of coils, at least three layers of coils, at least four layers of coils, fewer than five layers of coils, 4-6 layers of coils, etc. Coils 42 can be placed in a rectangular array having rows and columns and/or may be tiled using a hexagonal tile pattern or other pattern.

System 8 may be configured to accommodate the simultaneous charging of multiple devices 24. However, illustrative operations involved in operating system 8 to provide power wirelessly to a single device 24 are described herein as an example. A user of system 8 may place wireless power receiving devices such as device 24 of FIG. 2 on device 12 for charging. Magnetic coupling coefficient k represents the amount of magnetic coupling between transmitting and receiving coils in system 8. Wireless power transfer efficiency scales with k, so optimum charging (e.g., peak efficiency) may be obtained by evaluating the coupling coefficient k for each coil and choosing appropriate coil(s) to use in transmitting wireless power to device 24 based on the coupling coefficients.

Figure 3:
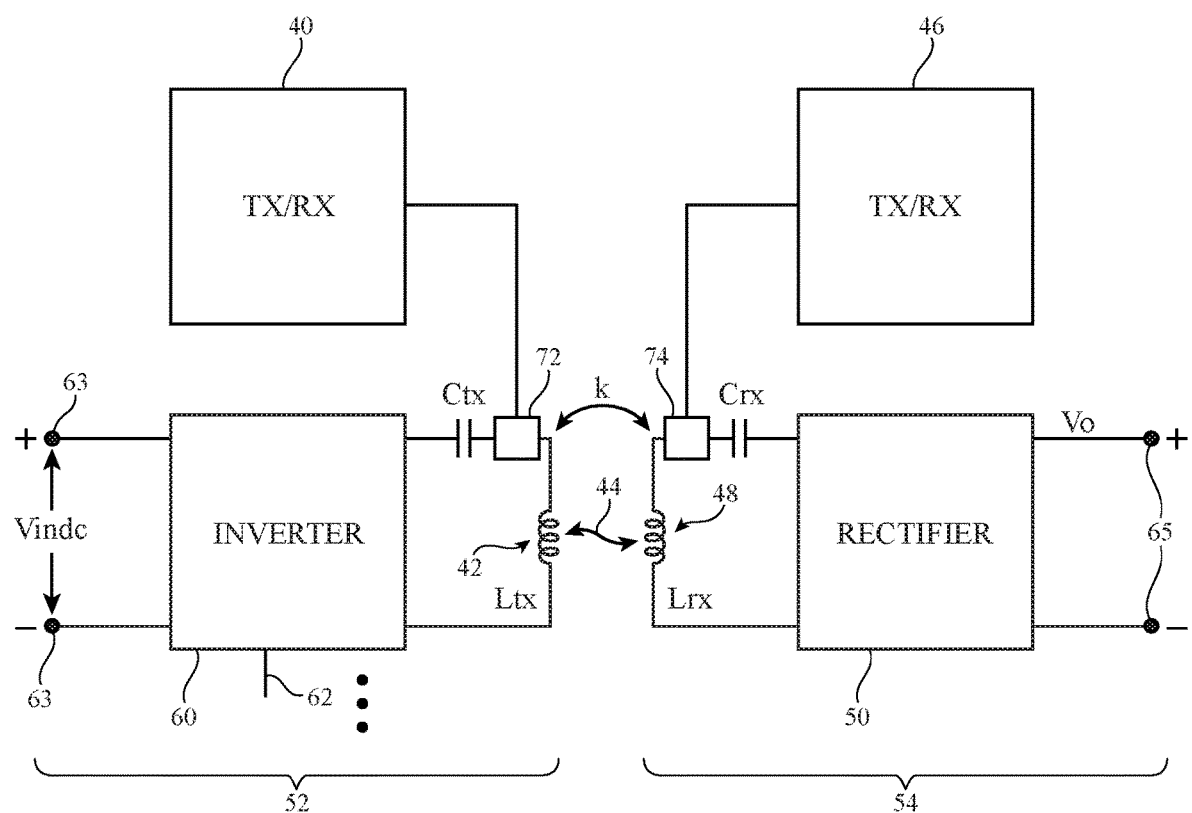
FIG. 3 is a circuit diagram of illustrative wireless power transmitting circuitry, wireless power receiving circuitry, and wireless transceiver circuitry in accordance with an embodiment.

Illustrative circuitry of the type that may be used for forming power transmitting circuitry 52 and power receiving circuitry 54 of FIG. 1 is shown in FIG. 3. As shown in FIG. 3, power transmitting circuitry 52 may include drive circuitry (inverter circuitry) for supplying alternating-current drive signals to coils 42. With one illustrative configuration, the inverter circuitry includes multiple inverter circuits such as inverter 60 of FIG. 3 each of which is controlled by control circuitry 16 of device 12 and each of which is coupled to a respective one of coils 42 (e.g., through signal routing 72). After coupling coefficients k have been determined for each coil 42, control circuitry 16 can switch appropriate coil(s) 42 into use by selecting corresponding inverters 60 to use in driving signals into the coils.

Each inverter 60 has metal-oxide-semiconductor transistors or other suitable transistors. These transistors are modulated by an AC control signal from control circuitry 16 (FIG. 1) that is received on control signal input 62. The AC control signal controls modulate the transistors so that direct-current power (input voltage Vindc across direct-current power supply input terminals 63) is converted into a corresponding AC drive signal applied to coil 42 (having a self-inductance of Ltx) via its associated capacitor Ctx. This produces electromagnetic signals 44 (magnetic fields), which are electromagnetically (magnetically) coupled into coil 48 in wireless power receiving device 54.

The degree of electromagnetic (magnetic) coupling between coils 42 and 48 is represented by magnetic coupling coefficient k. Signals 44 are received by coil 48 (having a self-inductance of Lrx). Coil 48 and capacitor Crx are connected to rectifier 50. During operation, the AC signals from coil 48 that are produced in response to received signals 44 are rectified by rectifier 50 to produce direct-current output power (e.g., direct-current rectifier output voltage Vo) across output terminals 65. Terminals 65 are connected to and provide power to the load of power receiving device 24 (e.g., battery 58 and other components in device 24 that are being powered by the direct-current power supplied from rectifier 50).

Wireless transceiver circuitry 40 may be coupled to coil(s) 42 through signal routing 72. Wireless transceiver circuitry 46 may be coupled to coil 48 through signal routing 74. The wireless transceiver circuitry in each device may use the coils to transmit data (while the wireless power is also being transferred). The wireless transceiver circuitry in each device may include oscillators for generating carrier waves that are used to transmit data. Each transceiver may be used to transmit (e.g., modulate the carrier waves) or receive (e.g., demodulate the carrier waves) data (e.g., wireless transceiver circuitry 40 may transmit data to wireless transceiver circuitry 46 or wireless transceiver circuitry 46 may transmit data to wireless transceiver circuitry 40) while power is simultaneously being wirelessly conveyed from device 12 to device 24 using coils 42 and 48.

Signal routing 72 and signal routing 74 may include signal routing circuitry and/or filtering circuitry that allow the two signal sources to be combined. For example, signal routing 72 may allow signals from inverter 60 and signals from wireless transceiver circuitry 40 to be combined. Signal routing 74 may allow signals from wireless transceiver circuitry 46 and wireless power signals for rectifier 50 to be combined. Signal routing 72 and 74 may include any desired circuitry (e.g., switching circuitry, filtering circuitry, splitter circuitry, diplexer/multiplexer circuitry, impedance matching circuitry etc.). Signal routing 72 and 74 may include a passive filtering array. The filters in the passive filtering array may be LC filters, for example. Notch filters (e.g., LC notch filters) that are tuned to the relevant frequencies may be used. For example, a first notch filter may be tuned to the power transmission frequency and a second notch filter may be tuned to the frequency of the carrier wave used by the transceiver circuitry. This example is merely illustrative, and other types of filters (e.g., low-pass filters and high-pass filters) may be used in signal routing 72 and 74 if desired. In one illustrative embodiment, the coils may have a center tap for connection to the wireless transceiver circuitry in order to reduce the inductance to a desired level. In another example, the coils may be terminated through a separate lower value series inductor that the wireless transceiver circuitry is also connected to. Signal routing 72 and 74 may simultaneously perform an impedance matching function in addition to isolating the power circuits (e.g., inverter 60 and rectifier 50) from the wireless transceiver circuitry (40 and 46).

In FIG. 3 (and later, FIG. 4), signal routing 72 is depicted as being interposed between capacitor Ctx and inductor 42. Similarly, signal routing 74 is depicted as being interposed between capacitor Crx and inductor 48. However, it should be noted that this example is merely illustrative. Alternatively, signal routing 72 may be interposed between capacitor Ctx and inverter 60 and/or signal routing 74 may be interposed between capacitor Crx and rectifier 50. The voltages across capacitors Ctx and Crx may be relatively high. By placing signal routing 72 between capacitor Ctx and inverter 60, the operating voltage may be at the same level as the inverter (thus optimizing cost). Similarly, by placing signal routing 74 between capacitor Crx and rectifier 50, the operating voltage may be at the same level as the rectifier (thus optimizing cost).

For simplicity, the example of wireless transceiver circuitry 46 being used to transmit data to wireless transceiver circuitry 40 (while power is simultaneously being wirelessly conveyed from device 12 to device 24 using coils 42 and 48) is described herein as an example.

Wireless transceiver circuitry 46 may use a carrier wave to transmit data to wireless transceiver circuitry 40 (using coils 48 and 42). The carrier wave may have a frequency that is different than the power transmission frequency. For example, the carrier wave may have a frequency that is at least three times greater than the power transmission frequency, at least five times greater than the power transmission frequency, at least ten times greater than the power transmission frequency, at least fifteen times greater than the power transmission frequency, at least twenty times greater than the power transmission frequency, at least thirty times greater than the power transmission frequency, at least fifty times greater than the power transmission frequency, less than thirty times greater than the power transmission frequency, less than twenty-five times greater than the power transmission frequency, less than twenty times greater than the power transmission frequency, less than fifteen times greater than the power transmission frequency, less than ten times greater than the power transmission frequency, between ten and twenty times greater than the power transmission frequency, between twelve and twenty times greater than the power transmission frequency, etc. The frequency of the carrier wave may also be less than the power transmission frequency. For example, the carrier wave may have a frequency at least three times lower than the power transmission frequency, at least five times lower than the power transmission frequency, at least ten times lower than the power transmission frequency, at least fifteen times lower than the power transmission frequency, at least twenty times lower than the power transmission frequency, at least thirty times lower than the power transmission frequency, at least fifty times lower than the power transmission frequency, less than thirty times lower than the power transmission frequency, less than twenty-five times lower than the power transmission frequency, less than twenty times lower than the power transmission frequency, less than fifteen times lower than the power transmission frequency, less than ten times lower than the power transmission frequency, between ten and twenty times lower than the power transmission frequency, between twelve and twenty times lower than the power transmission frequency, etc. The carrier wave frequency may differ from the power transmission frequency by at least a factor of 5, at least a factor of 10, at least a factor of 15, at least a factor of 20, at least a factor of 30, less than a factor of 50, less than a factor of 25, etc. The frequency of the carrier wave may be about 2.0 MHz, greater than 500 kHz, greater than 1.0 MHz, greater than 1.5 MHz, greater than 2.0 MHz, greater than 2.5 MHz, greater than 3.0 MHz, greater than 5.0 MHz, less than 5.0 MHz, less than 3.0 MHz, less than 2.5 MHz, less than 2.0 MHz, less than 1.5 MHz, less than 1.0 MHz, between 500 kHz and 3.0 MHz, between 1.0 MHz and 3.0 MHz, between 1.5 MHz and 2.5 MHz, between 100 kHz and 1 MHz, less than 100 kHz, less than 500 kHz, greater than 100 kHz, etc. The carrier wave frequency's interference into the power transmission frequency may be less than −5 dB, less than −10 dB, less than −20 dB, less than −30 dB, greater than −5 dB, greater than −10 dB, greater than −20 dB, greater than −30 dB, between −5 dB and −30 dB, between −10 dB and −20 dB, etc.

The generated carrier wave(s) may be modulated by wireless transceiver circuitry 46 (and, accordingly, demodulated by wireless transceiver circuitry 40) using any desired modulation scheme. For example, phase-shift keying (PSK), frequency-shift keying (FSK), amplitude-shift keying (ASK), or quadrature amplitude modulation (QAM) may be used to modulate the carrier waves. Wireless transceiver circuitry 40 and/or wireless transceiver circuitry 46 may include an active modulator, if desired.

In one illustrative embodiment, wireless transceiver circuitry 46 may use two or more carrier waves (e.g., carriers) in a frequency-division multiplexing (FDM) data transmission scheme. In frequency-divisional multiplexing, multiple carrier frequencies (that are each independently modulated) may be used to transmit data. If desired, an orthogonal frequency-division multiplexing (OFDM) data transmission scheme may be used. In orthogonal frequency-division multiplexing, orthogonal carriers (that are each independently modulated using any desired modulation scheme) may be used to transmit data. In yet another illustrative example, the principles of power-line communication may be used to transmit data from wireless transceiver circuitry 46 to wireless transceiver circuitry 40.

If desired, data transmission from wireless transceiver circuitry 46 to wireless transceiver circuitry 40 may use or be based on an existing OFDM-based transmission scheme. For example, a digital subscriber line (DSL) standard such as asymmetric digital subscriber line (ADSL), high-bit-rate digital subscriber line (HDSL), or very-high-bit-rate digital subscriber line (VDSL) may be used. These DSL standards may use discrete multitone transmission (DMT) (sometimes referred to as Discrete Multi-Tone) to transmit data. Discrete multitone transmission is a method of separating a DSL signal so that the usable bandwidth is separated into multiple (e.g., 256, more than 256, or any desired number) frequency bands (channels). Within each channel, a quadrature amplitude modulation (QAM) scheme may be used. In other words, DMT is a type of OFDM-based communication system.

To summarize, wireless transceiver circuitry 46 may generate one or more carrier waves that are each modulated using any desired modulation scheme. The carrier waves generated by wireless transceiver circuitry 46 may be transmitted from coil 48 to coil 42 and demodulated by wireless transceiver circuitry 40. If desired, OFDM transmission may be used when transmitting the carrier waves. Discrete multitone transmission (DMT) may be a type of OFDM transmission that is used to transmit data to wireless transceiver circuitry 40. DSL-based standards such as ADSL, and/or VDSL, may use DMT and may be used for the data transmission. HDSL uses single carrier transmission and may be used for the data transmission.

Wireless transceiver circuitry 46 may send any desired data to wireless transceiver circuitry 40. Wireless transceiver circuitry 46 may, for example, transmit authentication information. In another example, wireless transceiver circuitry 46 may send information regarding or relevant to usage (e.g., battery usage) of wireless power receiving device 24 to wireless power transmitting device 12. For example, wireless power receiving device may transmit the current time of day, user history information including usage information associated with the current time of day, the current charge state of the battery of the wireless power receiving device, the amount of power being used (or desired to be used) by the wireless power receiving device, the maximum amount of desired received power, sensor information such as temperature or ambient light information, information regarding the operating environment of device 24 such as information gathered from on-line weather sources or location information, and/or information from calendar entries in the wireless power receiving device. This type of information may be sent to wireless power transmitting device 12 using wireless power transceiver circuitry 46 (using the in-band communication techniques described above).

In yet another example, wireless transceiver circuitry 46 may send information regarding or relevant to usage of other electronic devices to wireless transceiver circuitry 40. For example, wireless power receiving device 24 may communicate with other electronic devices (that may or may not also be wirelessly charged by wireless power transmitting device 12) such as a cellular telephone, tablet computer, a laptop computer, a wristwatch device or other wearable equipment, ear buds, a keyboard, a mouse, a display, and/or a stylus. Wireless power receiving device 24 may use wireless transceiver circuitry 46 to send information (e.g., any of the types of information listed above) regarding one of these other electronic devices to wireless transceiver circuitry 40.

Wireless transceiver circuitry 46 may send information downloaded from the internet to wireless transceiver circuitry 40. In one example described above, wireless transceiver circuitry 46 may transmit a firmware file to wireless transceiver circuitry 40. The transmitted firmware file may include, for example, a protocol or driver update. Wireless transceiver circuitry 46 may transmit other content or information that is downloaded by wireless power receiving device 24 over a cellular network or wireless local area network.

In general, wireless transceiver circuitry 46 may send any desired data (e.g., data regarding the wireless power receiving device, data regarding another electronic device, data downloaded from an external network) to wireless power transceiver circuitry 40. Similarly, although the example of wireless transceiver circuitry 46 sending data to wireless transceiver circuitry 40 was described above, wireless transceiver circuitry 40 may send any desired data (e.g., data regarding the wireless power receiving device, data regarding another electronic device, data downloaded from an external network) to wireless power transceiver circuitry 46.

To improve data transfer between wireless power transmitting device 12 and wireless power receiving device 24, error detection and/or correction may be performed during data transfer. Error detection and correction techniques may be applied to both in-band communication (e.g., in-band communication via coil(s) 42 and coil(s) 48 by using a high frequency carrier wave as described above) and out-of-band communications (e.g., Bluetooth communications). Error detection may help wireless power transmitting device 12 and/or wireless power receiving device 24 assess the performance of the channel being used for data communication.

In one illustrative example, redundant information (e.g. information that expands the data without adding substantive information) may be added to the transmitted data. For example, a cyclic redundancy check may be used or other types of redundant bits may be included in the transmitted data. This redundant information (e.g., one or more redundant bits) may enable evaluation of the channel quality. For example, the device receiving the information (either power transmitting device 12 or power receiving device 24) may determine how often an error occurs using the redundant information and assess the channel performance (e.g., by determining a bit error rate, signal-to-noise ratio, or other metric).

If desired, error correction may also be used while transmitting data between wireless power transmitting device 12 and wireless power receiving device 24. For example, forward error correction (FEC) may be used to enable correction of some errors without retransmission of the data. An automated repeat request (ARQ), in which acknowledgements and timeouts are used to ensure reliable data transmission may be used when transmitting data between wireless power transmitting device 12 and wireless power receiving device 24 if desired. In one embodiment, data transmission between wireless power transmitting device 12 and wireless power receiving device 24 may use a hybrid automatic repeat request (HARQ), which is a combination of forward error-correcting and ARQ error-control. In yet another embodiment, convolutional error correction with tail biting may be used.

In one possible embodiment, test data may be transmitted between wireless power transmitting device 12 and wireless power receiving device 24 to evaluate channel quality. For example, device 12 may transmit known test data to device 24. Device 24 may compare the received data to the known expected test data to assess transmission performance. If desired device 24 may transmit known test data to device 12 and device 12 may compare the received data to the known expected test data to assess transmission performance. The known test data may be compared to the received test data to determine how often an error occurs and assess the channel performance (e.g., by determining a bit error rate, signal-to-noise ratio, or other metric). Assessing the channel performance may be used for the purpose of demodulation, for example.

Figure 4:
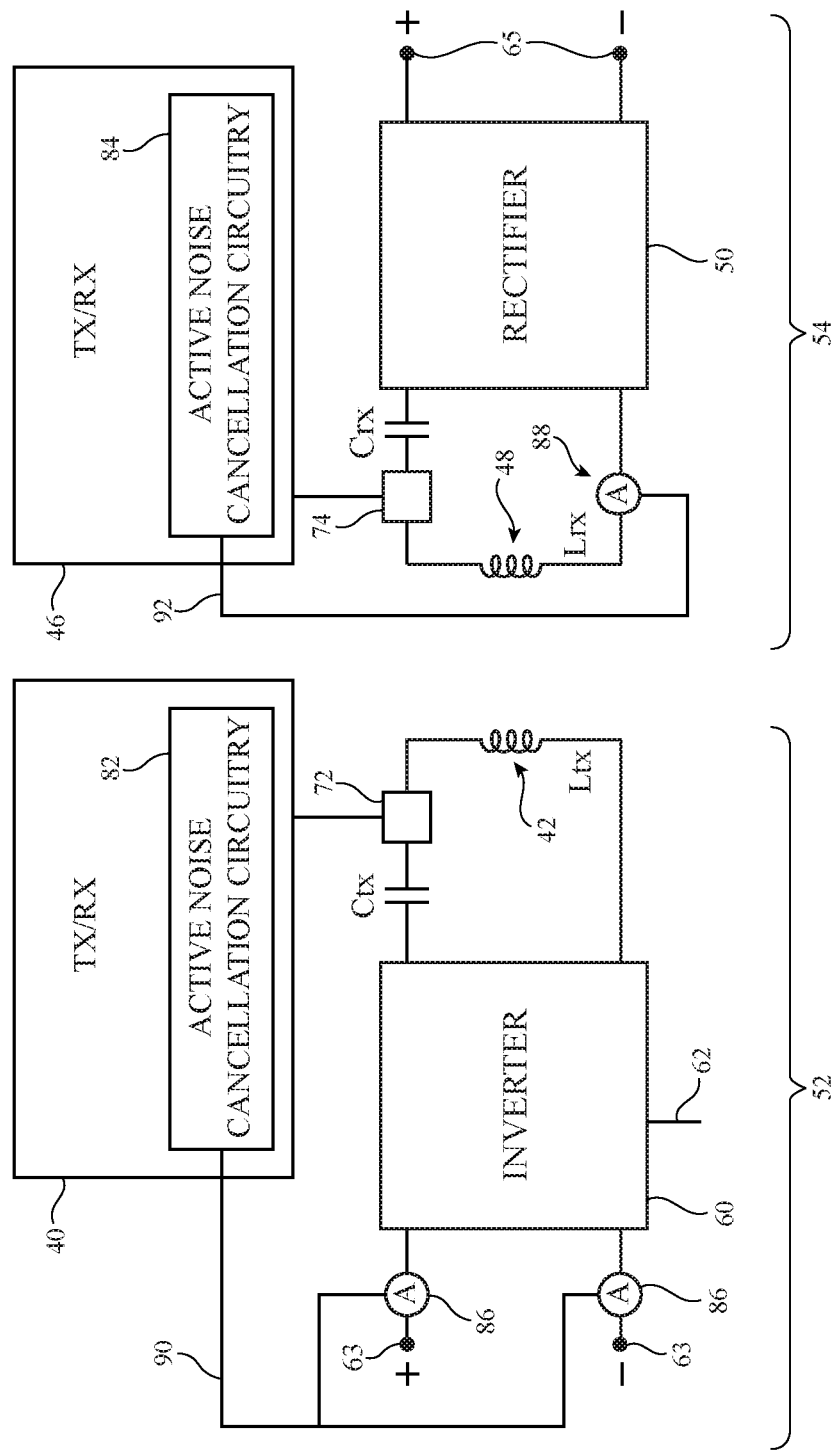
FIG. 4 is a circuit diagram of illustrative wireless power transmitting circuitry, wireless power receiving circuitry, and wireless transceiver circuitry with active noise cancellation functionality in accordance with an embodiment.

FIG. 4 shows an example of illustrative power transmitting circuitry and power receiving circuitry with active noise cancellation functionality. The circuitry of FIG. 4 is similar to that of FIG. 3, with an inverter 60 supplying alternating-current drive signals to coil 42 and a rectifier 50 that rectifies AC signals from coil 48 to produce direct-current output power across output terminals 65.

Noise may affect communications between wireless power transmitting device 12 (with power transmitting circuitry 52) and wireless power receiving device 24 (with power receiving circuitry 54). Noise may arise due to changes in the power supplied to direct-current power supply input terminals 63. Power supplied to input terminals 63 may have variations. In one example, an alternating-current (AC) to direct-current (DC) power converter may convert AC power from a wall outlet or other power source into DC power that is provided to input terminals 63. However, the DC power provided to input terminals 63 may have fluctuations. The load coupled to the rectifier in the power receiving circuitry may also be a source of noise. Terminals 65 (shown in FIG. 4) are connected to and provide power to the load of power receiving device 24. Changes in the load may result in noise that affects wireless communications between power transmitting device 12 and power receiving device 24.

To account for noise (and therefore improve wireless communications), transceiver circuitry 40 in wireless power transmitting device 12 may include active noise cancellation circuitry 82 and transceiver circuitry 46 in wireless power receiving device 24 may include active noise cancellation circuitry 84. The active noise cancellation circuitry may receive sensor data indicative of the noise present in the system and cancel out the noise based on the sensor data.

A first current sensor 86 (sometimes referred to as ammeter 86) may measure the electric current provided to inverter 60. Current sensor 86 is coupled to active noise cancellation circuitry 82 by signal path 90. Active noise cancellation circuitry 82 may cancel noise based on sensor data from current sensor 86 received over path 90. Current sensor 86 may be coupled in series with one or both of input terminals 63. A second current sensor 88 (sometimes referred to as ammeter 88) may measure the electric current on the AC side of rectifier 50. Current sensor 88 is coupled to active noise cancellation circuitry 84 by signal path 92. Active noise cancellation circuitry 84 may cancel noise based on sensor data from current sensor 88 received over path 92.

Active noise cancellation circuitry 82 and active noise cancellation circuitry 84 may both include any desired type of active noise cancellation circuitry. In one example, the active noise cancellation circuitry may include echo cancellers or other desired echo cancellation circuitry. The noise in the wireless power system (e.g., from variations in received DC power at input terminals 63 or load applied to output terminals 65) may be non-periodic. This noise may be referred to as transient noise (or dynamic noise). The active noise cancellation circuitry may therefore be configured to cancel transient noise.

The types and locations of sensors used to provide sensor data to the active noise cancellation circuitry in FIG. 4 are merely illustrative. In general, any desired types of sensors (e.g., ammeters, voltmeters, etc.) may be provided at any desired location within the wireless power transmitting circuitry and wireless power receiving circuitry to provide sensor data to corresponding active noise cancellation circuitry. In one illustrative example, a sensor may be provided to measure the direct-current output power supplied to the load through output terminals 65. The active noise cancellation may use information regarding the direct-current output power to cancel noise within the system.

In both FIGS. 3 and 4, wireless transceiver circuitry 40 and 46 may be used to transmit packets of data between wireless power transmitting device 12 and wireless power receiving device 24. The data packets may be exchanged using the modulated carrier wave(s) at a frequency or frequencies higher or lower than the frequency of the AC drive signals used for wireless power transfer that is transmitted between the coils of devices 12 and 24. The data packets may be exchanged during wireless power transfer or not during wireless power transfer (e.g., using a timeinterleaved data/power transmission scheme). However, the data packets may also be exchanged using the previously discussed frequency shift keying (FSK), amplitude shift keying (ASK), or any other desired modulation of the power transmission signals (at the power transmission frequency).

Regardless of the means of transmitting the data packet between wireless power transmitting device 12 and wireless power receiving device 24, the data packet may have a preamble. The preamble of the data packet may precede the packet payload. For example, each data packet may include a preamble, a header, a message (payload), and a checksum. In some cases, the preamble may include only '1' bits. For example, the preamble may have eleven consecutive '1' bits. However, including only '1' bits in the preamble makes it difficult to determine the shape of the '0' bits. To allow the transceiver circuitry to better discern between '1' bits and '0' bits when demodulating the received data packet, the preamble of the data packet may include both '1' bits and '0' bits. For example the preamble of the data packet may include alternating '1' bits and '0' bits (e.g., 1, 0, 1, 0, 1, 0, etc.). The preamble of the data packet may include 11 bits that alternate between '1' and '0'. This type of preamble allows the transceiver circuitry to better detect the structure of the signal and have a reference for the shape of both '1' bits and '0' bits. The transceiver circuitry will therefore have a better model of the channel and be able to better discern between '1' bits and '0' bits when examining the rest of the data packet.

Figure 5:
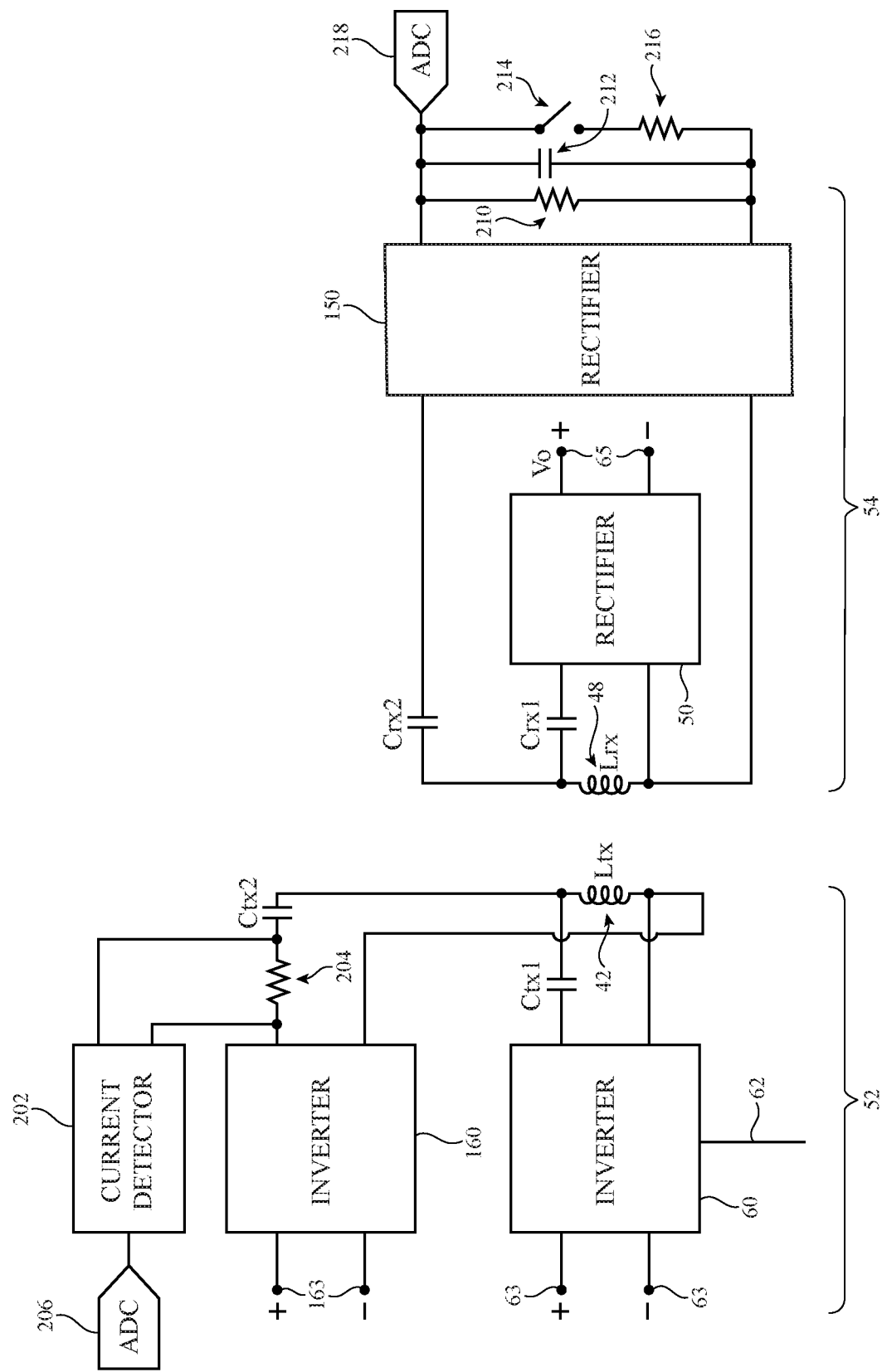
FIG. 5 is a circuit diagram of illustrative wireless transceiver circuitry that may be used to transmit data by modulating a carrier wave in accordance with an embodiment.

There are many possible arrangements for the signal routing (e.g., signal routing 72 and 74) that couple the wireless transceiver circuitry (e.g., wireless transceiver circuitry 40 and 46) to a respective coil (e.g., coils 42 and 48). FIG. 5 shows one possible arrangement in which an additional series-resonant inductive power transfer system is coupled in parallel with the first power transfer system for wireless communication. As previously shown in FIGS. 3 and 4, in FIG. 5 power transmitting circuitry 52 includes drive circuitry (inverter circuitry) such as inverter 60 for supplying alternating-current drive signals to coils 42 at a power transmission frequency. Capacitor $C_{tx1}$ is tuned to the power transmission frequency. Power receiving circuitry 54 includes a rectifier 50 for converting received AC signals from coil 48 into DC voltage signals for powering device 24. Capacitor $C_{rx1}$ is tuned to the power transmission frequency.

To inject one or more data carrier waves to the AC drive signals used for wireless power transfer, additional inverter 160 may be used. Inverter 160 may have respective direct-current power supply input terminals 163. Inverter 160 may be coupled to coil 42 in parallel with inverter 60. Capacitor $C_{tx2}$ may be tuned to the frequency of the carrier wave (e.g., a different frequency than the power transmission frequency). Capacitor $C_{tx2}$ may be considered a portion of signal routing 72. Inverter 160 may therefore serve as a transmitter of the carrier wave (e.g., inverter 160 may form a portion of transceiver 40 in FIG. 3). To receive signals at the carrier wave frequency, current detector 202 (coupled to either side of resistor 204) and analog-to-digital converter (ADC) 206 may be used. In other words, current detector 202 and ADC 206 serve as a receiver for the signals at the carrier wave frequency (e.g., current detector 202 and ADC 206 may form a portion of transceiver 40 in FIG. 3).

In the power receiving device, rectifier 150 may be coupled to coil 48 in parallel with rectifier 50. Capacitor $C_{rx2}$ is tuned to the frequency of the carrier wave (e.g., a different frequency than the power transmission frequency). Capacitor $C_{rx2}$ may be considered a portion of signal routing 74. To receive signals, resistor 210, capacitor 212, and analog-to-digital converter (ADC) 218 form an envelope detector. In other words, resistor 210, capacitor 212, and analog-to-digital converter 218 serve as a receiver for the signals at the carrier wave frequency (e.g., resistor 210, capacitor 212, and analog-to-digital converter 218 may form a portion of transceiver 46 in FIG. 3). To transmit information from the wireless power receiving device to the wireless power transmitting device at the carrier wave frequency, switch 214 and resistor 216 (sometimes referred to collectively as a modulator) may be used. Switch 214 may be selectively opened and closed to provide amplitude modulation of the carrier wave created by inverter 160.

The example in FIG. 5 of circuitry that may be used to transmit and receive information using a carrier wave is merely illustrative, and other arrangements may be used if desired. For example, an inverter (with associated current detector and ADC as shown on the transmitter side of FIG. 5) may be coupled to coil 48 in parallel with rectifier 50 to generate a carrier wave for wireless communication using coils 48 and 42.

The foregoing describes a technology that enables robust data transmission in the context of wireless power transfer. It is desirable for a wireless power transmitter and a wireless power receiver device to communicate information such as states of charge, charging speeds, so forth, to control wireless power transfer between devices. For example, the present technologies provide a robust system for transmitting technical measurements or values useful for the control of wireless power circuitries, such as the voltage and current being drawn by a receiver wirelessly.

It is possible, however, for entities to exploit the present technology to transfer other kinds of data, including data that are more personal in nature. Entities that do so, e.g., entities responsible for the collection, analysis, disclosure, transfer, storage, or other use of such personal information data should comply with well-established privacy policies and/or privacy practices for handling such information. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users, if collected, should be collected for legitimate and reasonable uses of the entity and not shared or sold outside of those legitimate uses. Further, such collection and sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

To the extent that the present technology is leveraged to transmit personal information data, hardware and/or software elements can be provided for users to selectively block the use of, or access to, personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading placing their wireless power receiver device onto a wireless power transmitter device that their personal information data will be accessed.

Further, risk of unauthorized use or access of data can be reduced by limiting the collection of data and deleting data once it is no longer needed. In addition, and when applicable, data de-identification can be used to protect a user's privacy. De-identification may be facilitated, when appropriate, by removing specific identifiers (e.g., unique device identifiers, MAC addresses, so forth), controlling the amount or specificity of data stored (e.g., collecting location data a city level rather than at an address level), controlling how data is stored (e.g., aggregating data across users), and/or other methods.

The foregoing is merely illustrative and various modifications can be made to the described embodiments. The foregoing embodiments may be implemented individually or in any combination.

What is claimed is:

1. An electronic device configured to receive wireless power from a power transmitting device, comprising:
    a coil that is configured to receive alternating-current magnetic signals transmitted from the power transmitting device and configured to produce corresponding alternating-current voltages having a first frequency;
    a rectifier coupled to the coil that is configured to rectify the alternating-current voltages and produce a corresponding rectified direct-current voltage; and
    wireless transceiver circuitry coupled to the coil that is configured to generate a carrier wave having a second frequency that is different than the first frequency and transmit the carrier wave to the power transmitting device using the coil while the coil is receiving the alternating-current magnetic signals at the first frequency.

2. The electronic device of claim 1, wherein the second frequency is at least ten times greater than the first frequency.

3. The electronic device of claim 1, wherein the second frequency is between 1.5 MHz and 2.5 MHz.

4. The electronic device of claim 1, wherein the wireless transceiver circuitry is configured to generate a plurality of carrier waves, wherein the carrier wave is one of the plurality of carrier waves, and wherein the wireless transceiver circuitry is configured to use orthogonal frequency-division multiplexing to transmit the plurality of carrier waves.

5. The electronic device of claim 4, wherein the wireless transceiver circuitry is configured to use discrete multitone transmission to transmit the plurality of carrier waves.

6. The electronic device of claim 4, wherein the wireless transceiver circuitry is configured to use a digital-subscriber-line based (DSL-based) transmission scheme to transmit the plurality of carrier waves.

7. The electronic device of claim 1, wherein the wireless transceiver circuitry is configured to modulate the carrier wave to convey a plurality of bits.

8. The electronic device of claim 7, wherein the plurality of bits include at least one redundant bit.

9. The electronic device of claim 1, wherein the wireless transceiver circuitry includes active noise cancellation circuitry.

10. The electronic device of claim 9, further comprising:
    a current sensor coupled between the coil and the rectifier, wherein the active noise cancellation circuitry receives sensor data from the current sensor.

11. The electronic device of claim 1, wherein the wireless transceiver circuitry is configured to transmit a data packet using the carrier wave and wherein the data packet has a preamble that includes at least one '0' bit.

12. The electronic device of claim 11, wherein the preamble has eleven total bits.

13. The electronic device of claim 1, wherein the wireless transceiver circuitry is configured to transmit a data packet using the carrier wave and wherein the data packet has a preamble that includes all '1' bits.

14. An electronic device configured to receive wireless power from a power transmitting device, comprising:
    a coil that is configured to receive alternating-current magnetic signals transmitted from the power transmitting device and configured to produce corresponding alternating-current voltages having a power transmission frequency;
    a rectifier coupled to the coil that is configured to rectify the alternating-current voltages and produce a corresponding rectified direct-current voltage; and
    wireless transceiver circuitry coupled to the coil that is configured to convey a plurality of data carrier waves using the coil while the coil is receiving the alternating-current magnetic signals at the power transmission frequency, wherein each data carrier wave has a respective frequency that is at least five times greater than the power transmission frequency.

15. The electronic device of claim 14, wherein the power transmission frequency is between 100 kHz and 205 kHz.

16. The electronic device of claim 15, wherein the respective frequency of each data carrier wave is between ten times and twenty times greater than the power transmission frequency.

17. The electronic device of claim 15, wherein the respective frequency of each data carrier wave is between 1.5 MHz and 2.5 MHz.

18. The electronic device of claim 15, wherein the respective frequency of each data carrier wave is greater than 1.5 MHz.

19. The electronic device of claim 14, wherein the wireless transceiver circuitry is configured to convey the plurality of data carrier waves using orthogonal frequency-division multiplexing.

20. The electronic device of claim 14, wherein the wireless transceiver circuitry is configured to convey the plurality of data carrier waves using discrete multitone transmission.

21. A wireless power transmitting device with a charging surface configured to receive a wireless power receiving device that has a wireless power receiving coil, the wireless power transmitting device comprising:
    a coil;
    wireless power transmitting circuitry coupled to the coil and configured to transmit wireless power signals at a first frequency with the coil; and wireless transceiver circuitry coupled to the coil that is configured to receive a data carrier wave from the wireless power receiving coil while the coil is transmitting the wireless power signals at the first frequency, wherein the data carrier wave has a second frequency that is different than the first frequency.

22. The wireless power transmitting device of claim 21, wherein the second frequency is at least ten times greater than the first frequency.

23. The wireless power transmitting device of claim 21, wherein the second frequency is between 1.5 MHz and 2.5 MHz.

24. The wireless power transmitting device of claim 23, wherein the first frequency is between 100 kHz and 205 kHz.

25. The wireless power transmitting device of claim 21, wherein the wireless transceiver circuitry is configured to receive a plurality of data carrier waves from the wireless power receiving coil, wherein the data carrier wave is one of the plurality of data carrier waves, and wherein the wireless transceiver circuitry is configured to use orthogonal frequency-division multiplexing to demodulate the plurality of data carrier waves.

26. The wireless power transmitting device of claim 21, wherein the wireless transceiver circuitry comprises active noise cancellation circuitry.

27. The wireless power transmitting device of claim 26, further comprising:
 a current sensor coupled to the wireless power transmitting circuitry, wherein the active noise cancellation circuitry receives sensor data from the current sensor.

28. The wireless power transmitting device of claim 21, wherein the wireless transceiver circuitry is configured to demodulate the data carrier wave to receive a data packet and wherein the data packet has a preamble that includes an alternating sequence of '1' bits and '0' bits.

29. The wireless power transmitting device of claim 28, wherein the preamble has eleven total bits.

* * * * *